United States Patent [19]

Nayar

[11] 3,862,840

[45] Jan. 28, 1975

[54] PROCESS FOR MANUFACTURE OF HARD AND NON-DEFORMABLE ALLOYS WITHOUT COMPACTING BY SINTERING IN THE SOLID-LIQUID PHASE

[75] Inventor: Harbhajan S. Nayar, Plainfield, N.J.

[73] Assignee: Airco, Inc., New York, N.Y.

[22] Filed: Dec. 20, 1972

[21] Appl. No.: 316,970

[52] U.S. Cl.......................... 75/200, 75/223, 75/224
[51] Int. Cl............................................... B22f 1/00
[58] Field of Search....................... 75/200, 223, 224

[56] References Cited
UNITED STATES PATENTS

| | | | |
|---|---|---|---|
| 2,828,226 | 3/1958 | Goetzel et al.......................... | 75/200 |
| 2,833,638 | 5/1958 | Owen..................................... | 51/309 |
| 3,329,487 | 7/1967 | Sowko et al. .......................... | 75/203 |
| 3,372,024 | 5/1968 | Parikh.................................... | 75/200 |
| 3,502,466 | 3/1970 | Vickery ................................. | 75/200 |
| 3,689,257 | 9/1972 | Oda et al. .............................. | 75/200 |

Primary Examiner—Stephen J. Lechert, Jr.
Assistant Examiner—B. Hunt
Attorney, Agent, or Firm—Larry R. Cassett; H. Hume Mathews; Edmund W. Bopp

[57] ABSTRACT

Hardfacing alloy powders are poured into a reusable mold. Thereafter, without application of external compaction forces, the mold and contained powders are subjected to a heating schedule which brings about direct particle liquid phase sintering of the contained powders to give high density products. The shape thus operated upon have one dimension less than or equal to about one-half inch, with at least one of the other dimensions being much larger than the specified dimension.

11 Claims, 1 Drawing Figure

PATENTED JAN 28 1975
3,862,840
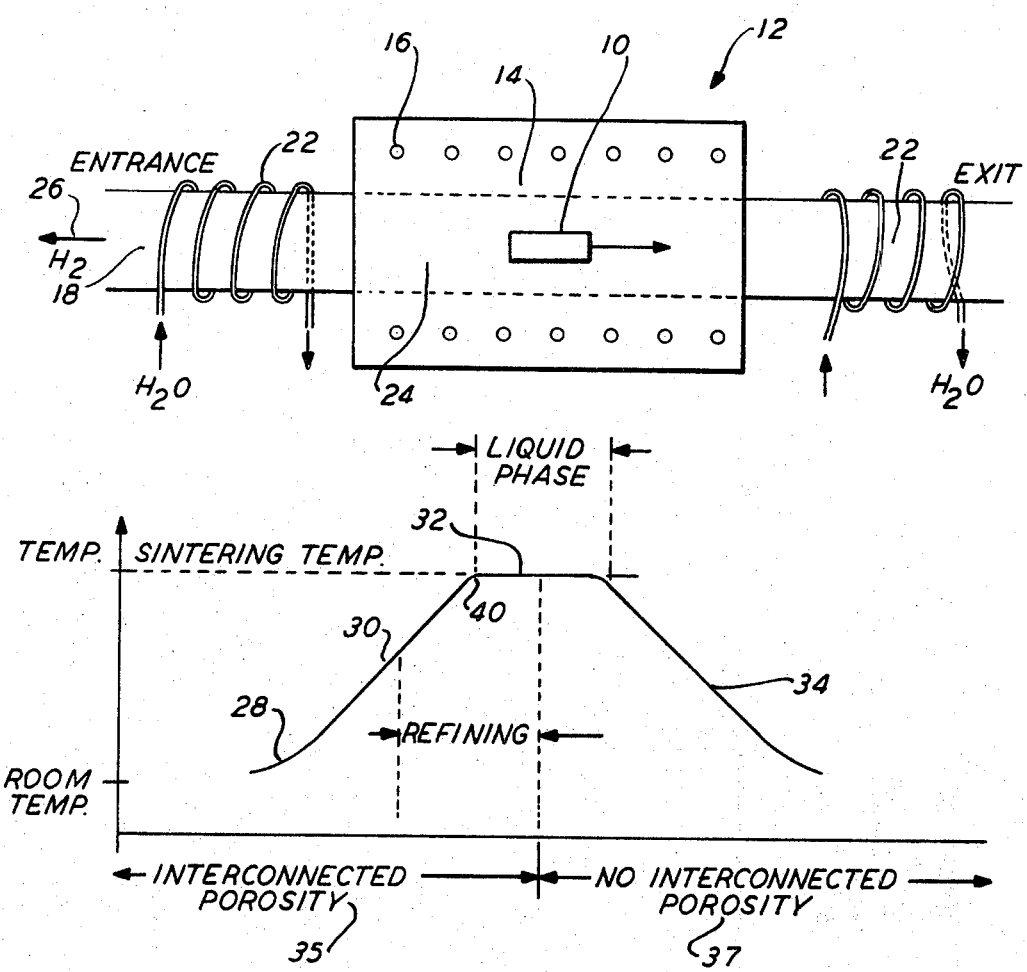

PROCESS FOR MANUFACTURE OF HARD AND NON-DEFORMABLE ALLOYS WITHOUT COMPACTING BY SINTERING IN THE SOLID-LIQUID PHASE

BACKGROUND OF INVENTION

This invention relates generally to hard and nondeformable alloy products, and more specifically relates to hardfacing alloy-base rods and plates, which products are utilizable in welding and other processes, for applying a hard overcoating upon a relatively soft underlying base material.

Hardfacing alloy rods, plates and similar shapes, wherein at least one dimension is very small in comparison to the major dimension of the shape have been used for many years in processes wherein a hard, overcoated facing is formed upon a relatively soft underlying base metal. Many of these processes are similar to conventional welding techniques, with the objective of the operations being to overcoat the workpiece with the material of the hardfacing rod or plate — as opposed to the usual objective of welding wherein two or more workpieces are joined together through the intermediate material derived from the welding rod.

The hardfacing alloys comprising the rods and plates mentioned above may be of a number of compositions. The present invention, however, is basically concerned with those hardfacing alloys which are not heterogeneous or distinctly two-phase composites (like tungsten carbide in a metallic matrix or like cermet materials). Among those hardfacing alloy compositions therefore of interest for purposes of the present invention are the standard hardfacing alloys of Groups 1 through 4 inclusive, which standard Groups are particularized, e.g., at Table 1, page 153 of Volume 6, *Metals Handbook* 8th Edition, published by American Society for Metals, Metals Park, Ohio; as well as the Laves phase alloys; and other nickel and/or cobalt-based hardfacing alloys. All of the cited materials are characterized by: (1) a fixed solidus and liquidus temperature always above 1,800°F; (2) a Rockwell "C" scale hardness greater than about 30, and (3) relative homogeneity in the alloy.

In the past, hard and nondeformable alloy articles having compositions of the type specified above, have principally been manufactured via conventional casting in sand mold cavities. In accordance with such prior techniques it is initially necessary to have the melt of the desired composition, at a temperature such that the molten metal is highly fluid. The superheat required to make certain compositions very fluid can often be more than 500°F above the liquidius temperature of the composition. Here it may be observed that the need to have additional superheat increases as one of the dimensions of the casting shape and size to be made becomes small — say less than one-half inch (e.g., when the casting is a long thin plate or rod). In particular, the thinner and longer castings require the molten alloy to be highly fluid in order to penetrate the narrow dimensions.

In the conventional sand molding techniques above referred to, suitable sand molds are furthermore prepared which must incorporate proper gates and risers. The said molds, however, are only usable but once, which adds considerably to the cost and time involved in preparing hard alloy shapes by these prior techniques. After the molten metal is frozen in the sand molds the mold is broken and the casting removed. Commonly, at least a portion of the sand adheres to the castings. The contaminated portions of the molded shapes are removed by various means, such as grinding, with attendant waste of the removed metal.

It has also in the past been proposed that permanent (chill) mold casting techniques be utilized for the purpose of preparing the shapes treated by the present invention. This approach, however, has been restricted to alloys the liquidus temperature of which are below about 2,100°F. This restricts the compositions which can be conveniently and economically cast via chill casting. Furthermore, such stringent requirements are also placed upon the mold materials that very few materials are indeed suitable for this purpose.

It has also been proposed that conventional powder metallurgy be used to make the desired hard and non-deformable alloy shapes, by first pressing the powder (pre-blended or pre-alloyed) into the desired size and shape, and then sintering such materials, with or without a liquid phase. These prior powder metallurgy approaches however, have been relatively unsatisfactory. For example, utilizing such prior techniques, if one desires to produce a 1 foot × 1 foot × ¼ inch plate, at least 4,000 tons force are required to make a compact. For most production operations, this is highly impractical and/or economically exhorbitant. Similarly, if one desires to produce a 1 foot × ¼ inch × ½ inch rod, the compacting pressures are relatively achievable, but the green compact rod is difficult to handle unless the compacting pressures are extremely high and the powder(s) are of high compactability. In point of fact, it is true that the conventional powder metallurgy approach is unacceptable in many instances, in that the relatively hard particles and powders simply cannot be compacted under any practical conditions.

In accordance with the foregoing, it may be regarded as an object of the present invention to provide a process according to which a variety of rod and plate-like hard and non-deformable alloy shapes may be prepared in an expeditious, simple and relatively inexpensive manner.

It is a further object of the present invention to provide a process for the molding of plate-like and rod-like shapes utilizable in application of hardfacing alloys, according to which a large variety of mold types may be utilized, and wherein the molds are not destroyed during the process of forming the said articles.

SUMMARY OF INVENTION

Now in accordance with the present invention, the foregoing objects, and others as will become apparent in the course of the ensuing specification, are achieved in a process which is particularly applicable to plate or rod-like shapes wherein one dimension is less than about ½ inch, and wherein at least one of the other dimensions thereof is considerably larger. According to the process the alloy powder composition is poured into a mold, which may typically comprise a graphite or ceramic material. Thereafter, without application of external compacting forces, the mold and contained materials are subjected to a heating schedule intended to effect liquid phase direct particle sintering of the powders. As no dependency upon a compacting step is thus involved, very hard particles can be processed in accordance with the invention. Furthermore, since the molten phase is entirely formed in situ, the maximum temperature necessary in accordance with the invention is considerably lower than those required by prior techniques, that is to say, the requirements for fluidity is eliminated. Furthermore, a much wider variety of molds can now be utilized, in that the only requirements for the mold materials is that the melting point thereof be higher than the desired sintering temperature, and that the material be substantially inert with the material being sintered. It will be appreciated further in this connection, that the reactivity of the mold material with the material placed in the mold depends, among other things, on the temperature and the amount of liquid phase. As in the present invention, the sintering temperature and the amount of liquid phase are considerably lower than the pouring temperature and the amount of liquid phase in conventional casting, the overall reactivity of any given mold material is considerably lower than that in conventional casting.

The heating schedule utilized in accordance with the present process is relatively gradual, and in consequence the mold materials may have relatively low thermal shock characteristics, in marked contrast to the requirement where chill casting methodology is utilized. The mold material also need not be of high abrasion resistance in that there is no wear on the mold by moving liquid as occurs in casting. Furthermore, in the earlier stages of the heating schedule, refining of the molded material may occur during the heating schedule, in that deoxidation and/or decarburization and/or denitrogenation and/or desulfurization is possible due to the considerable porosity in the material. Finally, for reasons that will become apparent hereinbelow, a very high density is achievable in accordance with the principles of the invention.

BRIEF DESCRIPTION OF DRAWINGS

The invention is diagrammatically illustrated by way of example in the drawings appended hereto, in which:

The FIGURE is a diagrammatic depiction of a suitable furnace arrangement utilizable for the process of the present invention; the graph below the furnace sets forth the temperature profile at various points along the progressive path of materials passing through the furnace.

DESCRIPTION OF PREFERRED EMBODIMENT

In accordance with the method of the invention, prealloyed or blended powders of desired composition are initially deposited in a suitable mold. The fill density of the powder in the mold is at least 40%, and preferably at least 50%, of its theoretical density. A typical mold may comprise graphite; but other materials including BN, $ZrO_2$, AlTiBN, $Al_2O_3$, or metals (or graphites) coated with nitrides, carbides, borides or oxides to provide desired inertness, may also be utilized. In point of fact the only requirements for the mold material are that the melting point thereof be higher than that of the particles, and that the mold material and the material to be formed into the rod or plate be substantially inert with respect to one another at the sintering temperature. The mold material can also have relatively low thermal shock characteristics as the heating to the sintering temperature and cooling from the sintering temperature is relatively gradual and slow — unlike that occurring in chill casting or other casting methods.

The present invention, as has been previously discussed, is applicable to the production of rod-like and plate-like shapes. For purposes of this specification such shapes may be characterized as geometrically regular, and if $a$, $b$, and $c$ represent the three principal dimensions of a given rod or plate, those bodies treatable by the invention are further defined as having at least one of the said dimensions less than or equal to ½ inch, with at least one other of the said dimensions being much greater than the cited ½ inch.

As is seen in the highly schematic showing of the FIGURE, a boat 10 or other carrier, carries the molds through the furnace 12. The latter includes a central hot zone region 14 provided with heating coils 16, an entrance zone 18 and exit zone 20, each of the latter being provided with water cooling coils 22. The tunnel passage 24 defined through furnace 12 may be provided with a flow 26 of hydrogen or other reducing gas. At the lower part of the FIGURE, a graph is set forth depicting the approximate temperature profile at various points of progression through furnace 12. It may be noted from this graph that the temperature rises but slightly above room temperature prior to hot zone 14, the beginning of which occurs at about point 28 on the graph. The temperature then rises in a manner approaching linear at the preheat zone 30. Thereafter a flat plateau 32 is attained — occurring at the midsection of the hot zone. This plateau represents the sintering temperature, and the temperature in this zone is above the solidus temperature of the composition being treated. In general, at least 40% by volume of the material contained in the mold will liquify before it leaves this flat region. Thereafter, toward the exit side of hot zone 14, the temperature profile descends gradually, in approximately linear fashion from plateau 32, as in zone 34.

Referring further to the graph of the FIGURE, it will be seen that two regions 35 and 37 are defined. These regions respectively define conditions (in the treated material) wherein interconnected porosity is and is not present. In particular, upon the particle mass reaching the sintering temperature (point 40 — always above the solidus or eutectic temperature corresponding to the alloy composition) the liquid phase begins to form. the density of the particle mass gradually increases as the time and amount of liquid phase formed increases. The maximum amount of liquid phase that can be formed primarily depends upon how far the sintering temperature is elevated above the eutectic or solidus and upon the composition of the alloy. The maximum possible level is, however, only reached after a certain elapsed time. After a certain amount of liquid phase is formed, the interconnected porosity becomes essentially zero. Remaining porosity exists as isolated pores.

Once the interconnected porosity is eliminated, reaction products such as water vapor and/or carbon monoxide cannot easily escape from the sintered particle mass in the pseudo-melt state. However, it will be apparent that purification, i.e., refining (such as decrease in oxygen, carbon, nitrogen, or sulphur levels) can be effected where interconnected porosity is present, such as at region 35 of the graph. Thus in accordance with the invention deoxidation and/or decarbonization and/or denitrogenization and/or desulfurization may be effected via the reducing gas (e.g., hydrogen), which readily penetrates the particle mass at region 35, or by the reaction between the $O_2$, S,C, or N in the particle mass. In this connection it will be appreciated that the degree of refining achieved will — among other things — be a function of the rate of heating the particle mass to the sintering temperature. It will also be appreciated that removal of some or all of these impurities can improve the quality of the resulting products.

At the sintering temperature, a portion of the powder melts to give the desired liquid phase. The liquid phase moves and penetrates into the contact region between the solid particles and also distributes itself to cover the solid particles. The presence of the liquid and resultant wetting of the solid particles induces compressive capillary forces that draw or pull the neighboring particles together. The capillary forces act on the curved liquid-gas (pore) surfaces, menisci, and on the three phase (liquid-solid-gas) contact lines. Thus the compact is essentially under uniform hydrostatic pressure, in consequence of which shrinkage and densification of the contained mass ensues. In accordance with the invention the temperature and duration of sintering are normally adjusted to yield densities of 80% of theoretical and greater.

The invention is further illustrated by the following Examples, which, of course, are to be regarded as merely illustrative and not delimiting of the practice thereof.

EXAMPLE 1

The compositions utilized in both Example I and Example II hereinbelow, were of the so-called Ni—Cr—Si—C—B hardfacing alloy materials. These materials, which are well-known in the art, (Group 4 B, Table 1, pg. 153, V6, *Metals Handbook*, supra) include constituents in the following approximate weight percent ranges: C-0.4 to 1.0; B-2.5 to 4.5; Si-2.0 to 5.5; Fe-1 to 5.0; Cr-10 to 18; and balance Ni. These materials are further characterized by a solidus temperature range of about 1,800°F. and a liquidus temperature range of about 1,900°F. Additionally these materials display a hardness above $R_c$ of 55, and cannot be produced in rod or plate form via conventional rolling, swaging or extrusion processes.

In the present example the specific prealloyed powder utilized comprised by weight percent C-0.63; B-3.1; Si-4.2; Fe-3.7; Cr-14.5; Ni-balance; and included oxygen-740 p.p.m. The sieve analysis of the sample indicated-100 mesh; tapp density 4.7 g/cc, 56% of theoretical density.

This prealloyed powder was poured into a graphite coated graphite mold having a cavity size of 23 inches × 5/16 inch × 5/16 inch, with the objective being to produce a rod size approximating 22 inches × ¼ inch × ¼ inch with slightly rounded edges, oxygen levels below 400 p.p.m. and a minimum density of 80%. The powder was poured at room temperature, tapped, refilled and leveled off. The fill density in the mold cavity was approximately the 4.7 g/cc indicated.

The boat carrying the mold was thereupon pulled through furnace 12 at a velocity of 24 inches per hour. Referring to the FIGURE, the sample passed through pre-heat zone 30 (about 12 inches wide) in approximately 30–32 minutes, and passed through the flat temperature zone 32, about 8 inches wide and maintained at about 1,030°C, in about 20 minutes.

The resultant rod fell readily from the mold cavity upon inversion thereof. The article was very smooth in appearance and when struck had a distinctly metallic sound. It displayed a density of 95% of theoretical density. The final oxygen content was 388 p.p.m.; thus the latter was reduced by approximately 50%. The sintered product was uniform in dimensions, had no interconnected porosity, and required no surface cleaning. Gas (oxy-acetylene) weld deposits made from the rod were excellent and showed average hardness of $R_c=59$.

When the travel speed v was increased considerably — e.g., to 36 inches/hour, the powder mass passed through zone 30 in about 22 minutes. The resultant oxygen levels in such samples were higher; however very little boron was lost, whereas in the above treatment boron decreased from 3.1 to about 2.8 weight percent. The time in zone 34 was also decreased (to about 14 minutes); thus less liquid was formed and accordingly the sintered density was about 85 to 90% of theoretical density.

When the travel speed v was considerably reduced below 24 inches/hr. (e.g. to about 18 inches/hour), the powder mass resided in zone 30 for about 45 minutes and in zone 32 for 27 minutes. Greater deoxidation occurred, together with a higher sintered density and more cast-like appearance — due to a relatively higher amount of liquid phase formation.

EXAMPLE II

The pre-alloyed powder utilized in this example was similar to that of Example I, but had an initially lower carbon content of 0.43%. Graphite powder (0.2 to 0.3%) was added to bring the carbon level to above 0.6% — this level is desired in order to achieve required hardfacing properties in the product, and as well to speed up the deoxidation process in pre-heat zone 30.

The sintering temperature utilized in this example was 1,045°C. and travel speed v=24 inches/hour. The resultant sintered rod (21 ¾ inch × ¼ inch × ¼ inch had only 338 p.p.m. oxygen, and very little boron was lost. The final carbon content was above 0.6% and the sample performance was excellent in the weld deposit test.

EXAMPLE

Certain Laves phase alloys are well-known for high wear resistance in metal-to-metal sliding contact applications — such as in bearing applications. These compositions are very viscous when in a molten state, and in consequence have a very low fluidity during casting, even when poured from temperatures as high as 1,700°C.

Thin wear-resistant plates (4 inches × 0.4 inch × ⅛ inch thick) of such an alloy (Co — 55; Ni — 35; Si-—10) were produced in accordance with the invention which provided 95% density and very low oxygen and carbon levels — the latter being a consideration necessary to yield good properties in the product.

The original powder included approximately 420 ppm of carbon, and 330 ppm of oxygen. The sieve analysis of the sample indicated 200/325 mesh; Tapp density was 5.3 g/cc. The powder was poured into a fine-grained zirconia mold, filled, tapped, refilled and scraped to provide a level sample. Sintering was effected using a tube furnace, such as that shown on the FIGURE herein. The sample was pulled through the furnace tube, under a hydrogen atmosphere at a rate of 22 inches/hr. The furnace was set at 1,280°C. This provided approximately 35 minutes in preheat zone 30, where most of the refining (deoxidation and decarburization) occurs, and about 22 minutes in the flat temperature zone 32 where a considerable amount (greater than 80% by volume) of liquid phase is formed to give very high sintered density.

The resultant sintered plate fell readily from the mold cavity upon inversion thereof. No reaction with the mold occurred. The mold was still in excellent condition and capable of being re-used. The sintered sample was 4 inches × 0.4 inch × ⅛ inch thick, and the sample displayed a smooth, clean, flat and cast-like surface. The sintered sample displayed a density of 8.45 g/cc density (95% of theoretical). Analysis of the sample indicated a content of only 68 ppm oxygen and 68 ppm carbon, thereby establishing that considerable deoxidation and decarburization occurred during sintering. It had no interconnected porosity.

The sintering plate was brazed to a soft copper base plate. The hardness of such plate was measured as $R_c$ — 61. The product was considered suitable for applications requiring severe metal-to-metal sliding contact.

EXAMPLE IV

Laves phase alloys of appropriately selected compositions are materials of choice for applications where high temperature metal-to-metal wear is involved, the material also being highly resistant to galling. Like most Laves phase alloys, these materials are very difficult to cast in thin cross-sectional forms, and almost impossible to cast (by any casting techniques) in cross sections less than ⅛ inch × ⅛ inch. A small cross-section (e.g. 1/16 inch × 1/16 inch or less) hardfacing body of such an alloy is especially useful in the hard surfacing of turbine blades which are very sensitive to excessive heat input during surface deposition using TIG welding approaches. In accordance with the present invention, however, rods measuring 10 inches × 0.04 inch × 0.05 inch displaying density greater than 8.0 g/cc have been successfully produced, from such materials as will now be set forth.

A Laves phase prealloyed powder was utilized having an approximate composition by weight percent of Co — 62; Mo — 28; Cr — 8; Si — 2; the original powder included approximately 1,000 ppm of carbon and 607 ppm of oxygen. The sieve analysis of the sample indicated — 200 mesh; Tapp denisity was 3.6 g/cc. The said powder was poured into an AlTiBN mold with cavity size of 11½ inches × 0.06 inch × 0.06 inch. The powder was then tapped and scraped off to give a level surface. Direct particle liquid phase sintering was thereafter effected under hydrogen using a tube furnace such as that set forth in the FIGURE herein. Set temperature was 1,245°C. at a rate of progression of 33 inches/hour. This yielded approximately 22 minutes in preheat zone 30 where most of the refining occurs, and about 15 minutes in the flat temperature zone 32 where a considerable amount of liquid phase is formed, and hence large amounts of uniform shrinkage occurs.

The resultant sintered rod fell readily from the mold cavity upon inversion. The sintered rod was 9.6 inches × 0.047 inch × 0.04 inch in dimensions. It had a density of 8.8 g/cc (approximately 95% of theoretical density). The sintered article was uniform, clean, and had a smooth surface. Its carbon and oxygen contents were 65 and 181 ppm respectively, indicating a considerable deoxidation and decarburization had occurred during sintering.

The sintered rod product was used to make a deposit on a steel baseplate using TIG welding techniques. The rod performed in excellent fashion during deposition and gave a surface hardness above $R_c$ = 45.

EXAMPLE V

The present example is particularly illustrative of an instance in which a "blended" as opposed to a "prealloyed" powder is utilized in accordance with the invention. In particular, in accordance with the present Example, a Laves phase alloy composition (55% Ni, 35% Mo, and 10% Si) was achieved by blending (by weight) 55% −100 mesh nickel powder, 27% of −200 mesh molybdenum disilicide powder, and 18% of −100 mesh molybdenum powders. Tapp density of the blend was about 4.0 g/cc. The carbon and oxygen levels in the blend were 960 and 3,200 ppm respectively. In accordance with the procedure used, the powder was poured into a graphite mold with a 17−⅛ inches × ⅜ inch × ⅜ inch cavity. Sintering was effected utilizing a tube furnace such as that set forth in the FIGURE herein. The furnace temperature utilized was 1,190°C, and a hydrogen atmosphere was present. The sample was pulled through the furnace at a progression rate of 44 inches/hour. This provided approximately 17 minutes in preheat zone 30 where most of the refining (deoxidation and decarbuization)occurs, and about 11 minutes in the flat temperature zone 32, where considerable amount of liquid is formed causing homogenization and shrinkage of the pre-blended powder mass in the mold cavity.

The resultant sintered article fell readily from the mold cavity upon inversion thereof. There was no reaction with the mold. The sintered article was 16−¼ inches × 0.287 inch × 0.284 inch. Its sintered density was 6.9 g/cc. The rod was smooth and clean. Its carbon and oxygen contents were, respectively, 500 and 2,300 ppm, indicating some decarburization and deoxidation did take place during the direct particle sintering step. The deoxidation could have been considerably augmented if the time in the preheat zone 30 had been increased to about 30 to 40 minutes instead of the 17 minutes actually utilized.

Using oxy-acetylene gas welding techniques, the rod article was used to make a deposit on a steel substrate. The rod performed well during deposition. The hardness of the resultant deposit was measured above $R_c$ = 34. The deposit showed good wear resistance during testing operations.

EXAMPLE VI

The present Example, among other things, illustrates that a protective atmosphere may be achieved through the use of a vacuum environment. The Example also will make clear that a batch furnace may be employed in accordance with the present invention as opposed to a furnace wherein the article undergoing treatment is transported through specified zones. The principle of the invention will thus be seen in this respect as one of establishing a specific schedule in terms of time and conditions for the materials being treated, and the said schedule may be provided by either moving a sample through successive zones wherein conditions are appropriately maintained, or alternatively the conditions may be, so to speak, brought to the article which itself remains relatively stationary.

In the present Example a cobalt-based Laves phase alloy was involved, of the type having a composition by weight percent of approximately Co-62, Mo-28, Si-2, Cr-8. Its solidus and liquidus temperatures are about 1,250°C, and 1,650°C. Its hardness is about $R_c=45$. This alloy although of vast potential application, has not in the past been susceptible of production in thin and relatively long lengths without incurring inordinately and unacceptably high costs. This alloy has a unique combination of high hardness, low friction, high resistance to wear, and galling, high corrosion resistance, and good high temperature strength. Such advantages in accordance with the present invention can now be utilized in many applications by simply hard surfacing an inexpensive or otherwise appropriate substrate with this alloy either by using welding techniques or by making a pre-form as a plate and joining such to the substrate. It must be noted that these alloys work more readily if the carbon content of the rod, plate or pre-form is well below 0.1% (in general the lower the carbon content the better).

In this Example the prealloyed powder specifically utilized had an approximate composition by weight percent of Co 62.0, Mo 26.6, Si 2.7, and Cr 7.4. The original powder included approximately 607 ppm of oxygen, and 0.1% carbon. The sieve analysis of the sample indicated −200 mesh. This powder was poured into a fine-grained Ti—Al—B—N mold having a cavity of 4—½ inches × 1—½ inches × 0.08 inch deep, the powder being tapped and scraped to provide a level sample. The sample was then placed in an initially cold zone which was evacuated to a pressure of 100 micron. The heating elements of the furnace were then turned on while evacuation proceeded. Temperature was thereby raised gradually to 1,288°C in an ensuing period of 2 hours. The 1,288°C temperature was held for about one hour, after which the sample was cooled. The final vacuum level was one micron.

The resultant article fell readily from the mold cavity upon inversion thereof. The dimension of the finished article was 3.85 inches × 1.22 inch × 0.060 inch. The weight of the article was 35.42 gram, indicating a density of about 7.7 g/cc, which is 86% of theoretical. The resultant article was deemed to be suitable for brazing to a softer underlying surface, as, for example, a copper plate. Where such is effected the resultant product is deemed excellent for wear-resistant applications.

While the present invention has been particularly described in terms of specific embodiments thereof, it will be understood in view of the present disclosure, that numerous variations upon the invention are now possible, which variations reside within the scope of the instant teaching. Accordingly, the invention is to be broadly construed and limited only by the scope and spirit of the claims now appended hereto.

I claim:

1. A method for manufacturing hard facing welding rods and wear resistant plates of a hard and non-deformable alloy composition, comprising the steps of:
   a. providing a mold cavity suitable for forming therein said articles, said cavity having dimensions slightly exceeding the principal dimensions $a$, $b$, $c$ of said article to be molded, at least one of said dimensions $a$, $b$, or $c$ being ½ inch or less, and at least one other of said dimensions being much greater than said ½ inch dimension;
   b. pouring into said cavity powders containing elements selected from the group consisting of iron, chromium, molybdenum, nickel, cobalt, boron, carbon and silicon and having a composition selected from the group consisting of (a) prealloyed powders of hard and non-deformable alloys characterized by (1) a homogeneous alloy structure, (2) a fixed solidus or eutectic above 1,800°F and (3) a rockwell C scale hardness greater than about 30, and (b) blended powders which yield said characterized hard and non-deformable alloys upon subjection to step (c) herein; and
   c. without application of external compaction forces heating said mold and contents to a temperature at or above the solidus temperature and below the liquidus temperature of the composition to effect liquid phase sintering of the contained powders; and
   d. allowing said sintered powders to cool so that a solidified and densified product is obtained.

2. A method in accordance with claim 1, wherein said powder comprises a nickel-based alloy having constituents in the following weight percent ranges; C-0.4 to 1.0; B-2.5 to 4.5; Si-2.0 to 5.5; Fe-1.0 to 5.0; Cr-10 to 18; and balance, nickel.

3. A process in accordance with claim 1, wherein said fill density of said powder in said mold is at least 40% of its theoretical density.

4. A process in accordance with claim 3, wherein said composition comprises a pre-alloyed powder.

5. A process in accordance with claim 3, wherein said composition comprises a blended powder.

6. A method in accordance with claim 3, wherein said mold comprises graphite.

7. A method in accordance with claim 3, wherein said mold comprises zirconia.

8. A method in accordance with claim 3, wherein said mold comprises AlTiBN.

9. A method in accordance with claim 3, wherein said heat step C is effected by subjecting said mold and contents to a heating schedule comprising in successive steps a slowly rising temperature for pre-heating; a flat temperature plateau at or above the said sintering temperature; and a slowly falling temperature for cooling.

10. A method in accordance with claim 9, wherein said heat treatment schedule is effected by passing said mold and contents through successively spaced zones of a heating furnace.

11. A method according to claim 9 wherein the duration of heating at said plateau step and the temperature thereat are such as to increase the density of the forms being sintered to at least 80% of theoretical density.

* * * * *